United States Patent [19]

Shimotake et al.

[11] 4,172,926

[45] Oct. 30, 1979

[54] ELECTROCHEMICAL CELL AND METHOD OF ASSEMBLY

[75] Inventors: Hiroshi Shimotake, Hinsdale, Ill.; Ernst C. H. Voss, Liederbach, Fed. Rep. of Germany; Louis G. Bartholme, Joliet, Ill.

[73] Assignee: The United States of America as represented by the United States Department of Energy, Washington, D.C.

[21] Appl. No.: 920,414

[22] Filed: Jun. 29, 1978

[51] Int. Cl.$^2$ .............................................. H01M 6/20
[52] U.S. Cl. .................................. 429/112; 29/623.1; 429/221
[58] Field of Search .................... 429/218, 112, 221; 29/623.1; 204/2.1

[56] References Cited

U.S. PATENT DOCUMENTS

| 3,981,743 | 9/1976 | Schaefer | 429/218 |
| 3,992,222 | 11/1976 | Walsh et al. | 429/112 |
| 4,011,373 | 3/1977 | Kaun et al. | 429/218 |

OTHER PUBLICATIONS

ANL-8109, High Performance Batteries for Off-Peak Energy Storage and Electric Vehicle Propulsion, Progress Report Jan.-Jun. 1974, Argonne National Laboratory, 1975, pp. 78-81.

Primary Examiner—Donald L. Walton
Attorney, Agent, or Firm—Dean E. Carlson; Frank H. Jackson; Hugh W. Glenn

[57] ABSTRACT

A method of preparing an electrochemical cell is disclosed which permits the assembly to be accomplished in air. The cell includes a metal sulfide as the positive electrode reactant, lithium alloy as the negative electrode reactant and an alkali metal, molten salt electrolyte. Positive electrode reactant is introduced as $Li_2FeS_2$, a single-phase compound produced by the reaction of $Li_2S$ and FeS. The use of this compound permits introduction of lithium in an oxidized form. Additional lithium can be introduced in the negative electrode structure enclosed within an aluminum foil envelope between layers of porous aluminum. Molten salt electrolyte is added after assembly and evacuation of the cell by including an interelectrode separator that has been prewet with an organic solution of KCl.

9 Claims, 2 Drawing Figures

ELECTROCHEMICAL CELL AND METHOD OF ASSEMBLY

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention related to an electrochemical cell and a method of assembly in air. Previously cells of the type described have been assembled under a dry helium or other inert gas environment. More particularly, the invention relates to the use of partially charged, electrode reactants that are not likely to be oxidized or to absorb moisture from an ordinary work-space environment.

The type of electrochemical cells contemplated are those that include the metal sulfides as the positive electrode reactant, for instance, $FeS$, $Fe_2S$, $CoS$, $CoS_2$, $NiS$, $NiS_2$, and $Cu_2S$, as well as the other sulfides of the transition metals. The negative electrodes include lithium as reactant in the form of solid alloys of lithium. Alloys of as lithium-aluminum and lithium-silicon have been considered for use. These cells employ molten salt electrolytes generally including the halides of the alkali metals and possibly of the alkaline earth metals. Combination of individual salts permits reduced melting points and lower operating temperatures. Examples of these types of cells are illustrated in the patents cited below in the prior art statement.

PRIOR ART STATEMENT

Kaun et al., "Uncharged Positive Electrode Composition", U.S. Pat. No. 4,011,373, Mar. 8, 1977. This patent describes an electrochemical cell with a positive electrode composition containing lithium sulfide and a transition metal powder for forming the transition metal sulfide when the cell is charged. Other lithium compounds are included in the composition. The negative electrode includes a metalloid such as aluminum or silicon for alloying with lithium or a lithium alloy containing low concentrations of lithium. The patent does not disclose the use of a single-phase compound of lithium, a transition metal and sulfur in the positive electrode in combination with the use of an aluminum foil envelope in the negative electrode for protecting the lithium against oxidation.

Shimotake et al., "Method of Preparing an Electrochemical Cell in Uncharged State", U.S. Pat. No. 4,006,034, Feb. 1, 1977. This patent discloses an electrochemical cell assembled in the uncharged state with lithium sulfide and a transition metal in the positive electrode and a metalloid such as aluminum or silicon for alloying with lithium in the negative electrode.

ANL-8109, "High Performance Batteries for Off-Peak Energy Storage and Electric Vehicle Propulsion", Progress Report Jan.-June 1974, Argonne National Laboratory 1975. This report discloses $Li_2FeS_2$ as a phase occurring in $Li/FeS_2$ cells but does not suggest its use in electrode preparation.

None of these referenced patents teach the novel method of assembling the electrochemical cell or the cell so assembled as is summarized below.

SUMMARY OF THE INVENTION

It is an object of the present invention to provide a method of assembling an electrochemical cell in an air environment.

It is also an object to provide a method of assembling an electrochemical cell to minimize absorption of moisture and oxidation of the reactant materials when the cell is assembled in air.

It is a further object to provide an electrochemical cell in a partially charged state that includes electrolyte, metal sulfides and lithium, all in a form that can be assembled in air with minimal oxidation or absorption of moisture.

In accordance with the present invention, a method is provided for assembling an electrochemical cell in air. The cell includes a metal sulfide positive electrode, a lithium alloy negative electrode, a porous, electrically insulative interelectrode separator and an electrolytic salt mixture including alkali metal halides. The method involves preparing the positive electrode with a reactant material in the form of $Li_2FeS_2$. Other metal sulfides such as the sulfides of copper, cobalt and nickel in minor proportions are contemplated in uniform mixture with the $Li_2FeS_2$, in solid solution within the $Li_2FeS_2$ and in partial substitution for the lithium and iron of the $Li_2FeS_2$. The negative electrode is prepared by sealing a layer of lithium or lithium metalloid alloy in metalloid foil and assembling that layer with at least one layer of porous metalloid. The metalloid is either aluminum or silicon. The electrically insulative separator is prewetted with an organic solution containing one of the alkali metal halides within the electrolyte. The positive and negative electrodes along with the interelectrode separator are sealed within the cell housing which is evacuated and filled with molten salt electrolyte mixture.

Further aspects of the present method include assembling the components in a dry room containing less than 30% relative humidity to further minimize any absorption of moisture by the cell constituents. Potassium chloride is less hygroscopic than other alkali metal halides and is used as a binder in forming a positive electrode compact. Potassium chloride dissolved in alcohol is a preferred organic solution for wetting the interelectrode separator prior to cell assembly.

The present invention also contemplates an electrochemical cell assembled by the above-described method. The positive electrode of this cell includes $Li_2FeS_2$ while the negative electrode includes layers of porous metalloid and a layer containing lithium or lithium-metalloid alloy enclosed within a metalloid foil envelope.

DETAILED DESCRIPTION OF THE PREFERRED EMBODIMENT

Figure 1:
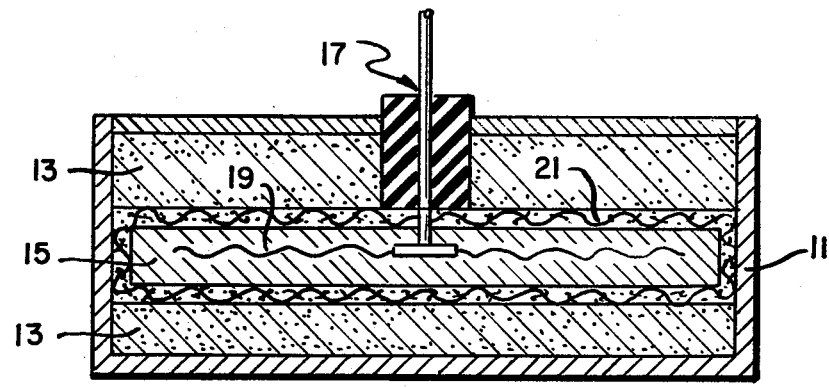
FIG. 1 is a cross-sectional elevation view of an electrochemical cell.

In one manner of preparing the positive electrode of the present development, a lithium and iron sulfide compound, $Li_2FeS_2$, is prepared. As is disclosed in the assignee's copending application by Z. Tomczuk, entitled "A Method of Preparing a Positive Electrode for an Electrochemical Cell", identified as Ser. No. 901,046, filed Apr. 28, 1978, this lithium-iron-sulfide compound is a single-phase compound that is particularly well suited for use as the positive electrode reactant material. The compound is prepared by blending powders of $Li_2S$ with powders of FeS in about equal molar amounts and heating to a temperature of about 1300 K. to form a molten reaction mixture. On resolidification, a single phase of $Li_2FeS_2$ is formed.

Mixtures of metal sulfides, for instance FeS and CoS, FeS and $Cu_2S$, and FeS and NiS, can be formulated for use in preparing the electrode reactant to obtain various advantages such as minimal electrode expansion on cycling and improved conductivity. In such mixtures a major proportion of FeS is blended with a minor proportion, e.g. less than 20 w/o, of another transition metal sulfide. In certain mixtures, e.g. FeS with $Cu_2S$, a single-phase material is formed with the added transition metal sulfide dissolved in solid solution within the $Li_2FeS_2$, or substituted in part for the Li or Fe within the $Li_2FeS_2$. In other mixtures, two phases are formed and a uniform physical mixture of the phases can be used as the positive electrode reactant material.

In the case of the iron sulfide positive electrode, the $Li_2FeS_2$ exists as a single-phase material and can be advantageously used in the preparation of the positive electrode. Other single phases have been found in the lithium-iron-sulfur system which also may be suitable for electrode preparation. Another such single-phase material has been identified as $Li_3Fe_2S_4$. The use of this material is one other manner of including lithium into the electrochemical cell in a combined form. Positive electrodes of $Li_3Fe_2S_4$ or $Li_3Fe_2S_4$ in mixture with $FeS_2$ can be prepared for assembly.

The lithium-iron-sulfide material is incorporated into a solid integral structure for use as a positive electrode in the electrochemical cell. This can be accomplished by a number of methods. For example, the reactant material can be embedded into a mesh or cellular honeycomb-like current collector structure. Also a compact of particulate electrode material and electrolytic salt as a binder can be prepared. In other methods, electrodes are prepared by distributing particles of the reactant material, e.g. by vibration, within a porous electrically conductive substrate of stainless steel, carbon or nickel. Also, carbon binder material such as monomers of furfuryl alcohol and a suitable polymerization agent or one of the various resin materials can be polymerized or solidified with particles of the reactant material to form a porous electrode structure. Each of these techniques are well known processes that are clearly described in prior art patents and publications.

Where particulate electrolyte is included as a binder or otherwise blended within the positive electrode preparation, it is desirable that one with minimum hygroscopic activity be selected. Potassium chloride is a preferred choice for this use. The final electrolyte composition can be suitably adjusted after cell assembly by adding other alkali metal halides, e.g. LiCl in molten state, under a vacuum filling procedure.

As explained above, positive electrode material can be prepared with more than one metal sulfide in mixture to form a single-phase material. Through use of this technique, various metal sulfide additives can be incorporated into the positive electrode at lower concentrations than that of the principal metal sulfide reactant. One particularly suitable combination includes equal parts of FeS and LiS with approximately two parts $Cu_2S$. The copper sulfide is either soluble within the resulting material or the copper substitutes for the iron or lithium within the phase structure.

The positive electrode as thus prepared can be assembled with one or more negative electrodes within an electrochemical cell housing and electrochemically charged to provide metal sulfides of higher oxidation states, e.g. $FeS_2$, $NiS_2$, $CoS_2$, $CuS_2$ and mixtures of these materials in the positive electrode.

The negative electrode includes lithium as its reactant material. The cell is assembled with much of the lithium included within the lithium-iron-sulfide material of the positive electrode. Additional lithium is included as lithium-metalloid alloy or as lithium metal within the negative electrode. On electrochemical cycling, the charged negative electrode will contain lithium mostly as lithium-metalloid alloy.

The negative electrode, as assembled, can be plaques or layers of a porous metalloid such as aluminum or silicon that may contain low concentrations of lithium, e.g. less than 10 weight percent lithium. These low concentrations of particularly lithium and aluminum have been found to only undergo minimal reaction with moisture and oxygen in air if the exposure is limited to a few hours.

Additional lithium can be provided as layers of lithium metal or lithium alloy, e.g. 30 to 80 atom percent lithium in aluminum, sealed within aluminum foil envelopes to prevent contact with the atmosphere. This additional lithium within the negative electrode permits discharging the positive electrode to an oxidation level lower than that of the lithium-iron-sulfide compound provided at assembly. That is, $Li_2FeS_2$ can be discharged to form Fe and $Li_2S$. In other cells operation at the upper plateau between $FeS_2$ and $Li_2FeS_2$ is desired and large additions of lithium in the negative electrode are not required. The electrochemical cell of FIG. 1 is presented merely to illustrate a typical cell that can incorporate the teachings of this invention. It will be understood that various other cell structures, for instance those illustrated in the above-cited patents, can also be employed or modified in accordance with the present invention.

A cell container or housing 11 is illustrated with two negative electrodes 13 disposed on either side of a positive electrode 15. An electrical feedthrough assembly 17 provides electrical access to a current collector structure 19 within the positive electrode. The positive and negative electrodes are separated by an electrically insulative separator material 21 which in the operating cell is permeated with molten electrolytic salt. The interelectrode separator 21 can be a cloth, fabric, felt, porous layers of entangled fibers, porous ceramic or merely layers of electrically insulative powder. The material used is one which is compatible with the cell reactants at the cell operating temperatures and can include such materials as boron nitride, yttria, magnesium oxide, calcium oxide and various other high-temperature electrically insulative materials.

Prior to cell assembly, the interelectrode separator is prewetted with an organic solution of an alkali metal halide. Potassium chloride dissolved in an alcohol like methanol, ethanol, propanol or isopropanol is preferred for this purpose. The use of the relatively nonhygroscopic KCl minimizes moisture absorption during cell assembly. This prewetting procedure facilitates molten salt electrolyte permeation of the separator during cell operation.

The negative electrodes 13 are illustrated as porous plaques or layers of a lithium-metalloid alloy such as lithium-aluminum or lithium-silicon. As indicated above, the negative electrode as assembled includes additional lithium to that in the positive electrode. To provide this additional lithium, the negative electrode may include low lithium alloy concentrations of, for instance, less than 10 weight percent lithium.

Figure 2:
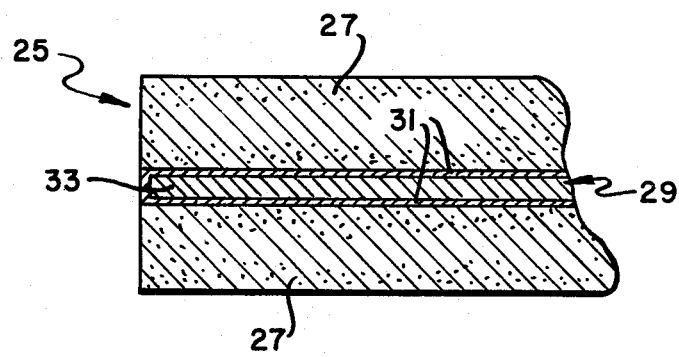
FIG. 2 is a cross-sectional view of a negative electrode.

One other method of incorporating additional lithium to that initially included as $Li_2FeS_2$ is illustrated in FIG. 2. FIG. 2 shows a fragmentary portion of a negative electrode 25 as it appears prior to assembly and cycling within an electrochemical cell. Electrode 25 includes upper and lower layers 27 of porous metalloid or metalloid-lithium alloy having less than 10 weight percent lithium. A central layer 29 includes an outer envelope 31 of metalloid foil that completely encloses a center core layer 33 of lithium or lithium metalloid alloy. The center core layer 33 can be a thin sheet of lithium metal or it can comprise alternate layers of lithium and metalloid foil. The layers of lithium and metalloid foil are preferably compacted together under an inert gas atmosphere at a temperature in excess of the melting point of lithium metal to form a high lithium alloy, e.g. about 30 to 80 atom percent lithium. The central core 33 is sealed within the metalloid foil envelope 31 and is compacted or otherwise consolidated between the two porous layers 27 to form an integral negative electrode structure.

The completed electrodes 13 and 15 along with separator 21 are assembled and sealed within cell housing 11. This is advantageously done in a dry room of less than 30% relative humidity to minimize moisture absorption. The housing is then evacuated and molten salt electrolyte introduced through a sealable connection that is not shown in the drawing. Various well-known salts such as LiCl—KCl can be used with the amount of KCl included in the separator and electrodes taken into account in determining the desired composition. Various other suitable electrolytic salts are listed in U.S. Pat. No. 3,488,221 to Shimotake et al.

It will be understood that, although the negative electrode has been described in terms generally of lithium and aluminum, other reactant and metalloid materials are contemplated. For instance, the negative electrode systems of calcium-aluminum, calcium-silicon, and calcium-magnesium may advantageously incorporate the present method of electrode and electrochemical cell assembly.

The following examples are presented merely to illustrate the present invention.

EXAMPLE I

A positive electrode including $Li_2FeS_2$ blended with approximately 10 w/o carbon powder for current collection is bound through the polymerization of furfuryl alcohol polymer into a porous positive electrode structure. The electrode is assembled in an electrochemical cell housing opposite to a negative electrode containing a porous lithium-aluminum plaque in alloy form with about 7 weight % lithium. The components of the cell are assembled in air with the molten electrolyte introduced following electrode assembly and evacuation of the cell housing. The cell is fully charged to form $FeS_2$ and other higher reductive states in the positive electrode and higher lithium concentrations within the lithium alloy of the negative electrode.

EXAMPLE II (Cell VB-2)

A positive electrode was prepared by hot-pressing a plaque of $Li_2FeS_2$ powder blended with KCl in a weight ratio of about 1 to 3. The cell is built and assembled completely in air by sealing the positive electrode along with a negative electrode including 8 w/o lithium in a lithium-aluminum alloy within the cell housing separated by a boron nitride cloth soaked in KCl-methyl alcohol solution. After the cell assembly molten LiCl—KCl was introduced under vacuum conditions into the cell housing and the cell completely sealed. The cell operated for nearly 1100 hours and 80 cycles with nearly 100% coulombic efficiency in the early cycles. Utilization of 50 to 60% of the active material was noted during operation between cutoff voltages of 1.3 and 2.2 on discharge and charge.

EXAMPLE III (Cell VB-3)

A cell similar to that described in Example II is prepared on a 2–2½ factor increase in scale except that the negative electrode includes a porous plaque of aluminum metal with a thin central layer enclosed in an aluminum foil envelope containing lithium metal. This cell was operated between cutoff voltages of 1.2 to 2.15 for over 45 cycles and 35 days. Capacities of 45 to 65 A-hrs at 1 to 12 hour discharge rates were noted. Coulombic efficiencies of 85–95% were typical. Additional data are presented below in Table I.

TABLE I

|  | Example II Cell VB-2 | Example III Cell VB-3 |
|---|---|---|
| Positive Electrode |  |  |
| Active Material |  |  |
| $Li_2FeS_2$, g | 107 | 296 |
| KCl, g | 31 | 85 |
| Electrode Area, $cm^2$ | 71 | 278 |
| Theo. Capacity, A-hr | 45 | 118 |
| Initial Thickness, cm | 0.9 | 1.2 |
| Mo Current Collector, g | 14.3 | 90 |
| Assembly Weight, g | 152.3 | 471 |
| Negative Electrode |  |  |
| Active Material |  |  |
| Al | 47.4 | 199 |
| LiAl (8 w/o Li) | 35.4 | — |
| Li | — | 6.2 |
| Electrode Area, $cm^2$ | 71 | 290 |
| Current Collector | 70 | 178 |
| Assembly Weight, g | 152.8 | 385 |
| Electrolyte, g | 210 | 435 |
| Separator | BN cloth | BN cloth |
| Total Weight, g (With Salt) | 880 | 1835 |

It will be clear from the above examples and description that the present invention provides a method of preparing an electrochemical cell in an air environment. The negative electrode material, particularly lithium, is mostly included in a combined state as a partially charged positive electrode phase. This minimizes oxidation or the absorption of moisture from the air environment. Further, the hygroscopic electrolyte material is not added in the cell until it has been sealed and evacuated to minimize its exposure to moisture. A generally nonhygroscopic alkali metal chloride is blended with the positive electrode material as a binder and permeated into the interelectrode separator to insure wetting during the in-air cell assembly to permit the delayed filling of electrolyte.

Various other modifications can be made to the cell structure, materials and components as described above within the scope of the claims.

The embodiments of the invention in which an exclusive property or privilege is claimed are defined as follows:

1. A method of assembling an electrochemical cell in air, the cell including a metal sulfide positive electrode, a lithium alloy negative electrode, a porous and electrically insulative interelectrode separator and an electrolytic salt mixture including alkali metal halides comprising:
   preparing a positive electrode including reactant material in the form of $Li_2FeS_2$,
   preparing a negative electrode including a layer of porous metalloid or lithium-metalloid alloy, the metalloid being selected from the group consisting of aluminum and silicon;
   prewetting a porous electrically insulative separator layer with an organic solution of an alkali metal halide;
   sealing the positive electrode, negative electrode, and interelectrode separator within a cell housing;
   evacuating the housing and filling with molten electrolytic salt mixture; and
   electrically cycling the cell to form lithium-metalloid alloy in the negative electrode.

2. The method of claim 1 wherein said positive electrode reactant material is provided in particulate form and is blended with an alkali metal halide consisting of particulate KCl for incorporation into an integral, positive electrode structure.

3. The method of claim 1 wherein said negative electrode is prepared by sealing a layer of lithium or lithium-metalloid alloy within an envelope of metalloid foil and assembling said sealed layer with a layer of porous metalloid or lithium-metalloid alloy.

4. The method of claim 1 wherein said negative electrode is prepared by sealing a layer of lithium metal within an aluminum foil envelope and assembling said envelope between two layers of porous aluminum to provide an electrode structure.

5. The method of claim 1 wherein said negative electrode is prepared by pressing together a layer of lithium foil with a layer of aluminum foil at a temperature above the melting point of lithium followed by sealing the resulting alloy in an envelope of aluminum foil, the sealed aluminum foil envelope is pressed between two layers of porous aluminum to form an integral electrode structure.

6. The method of claim 1 wherein said organic solution comprises an alcohol selected from the group consisting of methanol, ethanol, propanol and isopropanol and said alkali metal halide dissolved therein consists of KCl.

7. The method of claim 1 wherein said cell is assembled in air having less than 30% relative humidity.

8. The method of claim 1 wherein said molten electrolytic salt mixture comprises LiCl and KCl.

9. An electrochemical cell including a metal sulfide as a positive electrode reactant and lithium as a negative electrode reactant assembled in less than the fully charged state comprising:
   in the positive electrode, reactant material consisting essentially of $Li_2FeS_2$ blended with an alkali metal halide consisting essentially of KCl;
   in the negative electrode a compact formed of a first layer consisting essentially of porous aluminum and a second layer comprising lithium or lithium-aluminum alloy sealed within an envelope of aluminum foil;
   a porous, electrically insulative separator permeated with an alkali metal halide consisting essentially of KCl disposed between the positive and negative electrode; and
   electrolytic salt including an alkali metal halide between the two electrodes.

* * * * *